United States Patent
Jones et al.

(10) Patent No.: US 7,103,322 B2
(45) Date of Patent: Sep. 5, 2006

(54) EQUIPMENT SHELF-RESIDENT NETWORK INTERFACE UNIT BY-PASS CIRCUIT

(75) Inventors: David Eric Jones, Huntsville, AL (US); Jason N. Morgan, Madison, AL (US); Stacy Morris Murphree, Harvest, AL (US); Jason Ted Brock, New Market, AL (US)

(73) Assignee: Adtran, Inc., Huntsville, AL (US)

( * ) Notice: Subject to any disclaimer, the term of this patent is extended or adjusted under 35 U.S.C. 154(b) by 648 days.

(21) Appl. No.: 09/971,413

(22) Filed: Oct. 5, 2001

(65) Prior Publication Data

US 2003/0036363 A1    Feb. 20, 2003

Related U.S. Application Data

(60) Provisional application No. 60/313,100, filed on Aug. 17, 2001.

(51) Int. Cl.
*H04B 1/17* (2006.01)
*H04B 1/38* (2006.01)
*H04B 17/00* (2006.01)
*H04Q 7/20* (2006.01)

(52) U.S. Cl. .................. 455/90; 455/67.11; 455/90.3; 455/115.1; 455/226.1; 455/423

(58) Field of Classification Search ........ 455/423–425, 455/67.11, 575.1, 90.3, 115.1–115.4, 226.1
See application file for complete search history.

(56) References Cited

U.S. PATENT DOCUMENTS

| 4,442,502 | A | * | 4/1984 | Friend et al. ............... 710/316 |
| 6,052,733 | A | * | 4/2000 | Mahalingam et al. ....... 709/235 |
| 6,292,379 | B1 | * | 9/2001 | Edevold et al. .............. 363/71 |
| 6,452,924 | B1 | * | 9/2002 | Golden et al. .............. 370/352 |

* cited by examiner

*Primary Examiner*—George Eng
*Assistant Examiner*—Michael Thier
(74) *Attorney, Agent, or Firm*—Allen, Dyer, Doppelt, Milbrath & Gilchrist, P.A.

(57) ABSTRACT

A (DS3) network interface unit (NIU) by-pass architecture places the NIU on its own circuit card and exclusive of by-pass switching (and relay) components, which are installed in the equipment shelf, proper, so that physical removal of the NIU card will leave the by-pass circuitry intact. The by-pass circuit responds to an abnormality of the NIU card, such as malfunction or physical removal of the NIU from its card slot, and also to a power supply failure. It also contains an indicator to draw attention to a failed NIU, increasing the likelihood that someone will notice a damaged card.

16 Claims, 3 Drawing Sheets

EQUIPMENT SHELF-RESIDENT NETWORK INTERFACE UNIT BY-PASS CIRCUIT

CROSS-REFERENCE TO RELATED APPLICATION

The present application claims the benefit of copending U.S. Provisional Patent Application Serial No. 60/313,100, filed Aug. 17, 2001, by David E. Jones et al, entitled: "DS3 NETWORK INTERFACE UNIT BY-PASS WITHIN HOUSINGS AND SHELVES," assigned to the assignee of the present application and the disclosure of which is incorporated herein.

FIELD OF THE INVENTION

The present invention relates in general to communication systems and components therefor, and is particularly directed to a (DS3) network interface unit (NIU) by-pass arrangement, that is configured to by-pass the NIU in the event of one or more malfunction conditions, in addition to power failure, including failure and/or removal of the NIU card, so as to minimize an interruption of digital communications between respective customer and network digital communication devices over the communication circuit to which the NIU is controllably coupled.

BACKGROUND OF THE INVENTION

Equipment shelves of telecommunication service providers often contain communication circuit performance monitoring equipment, such as (DS3-associated) network interface units (NIUs). These devices are used to identify problems of a (digital) communication circuit to which they are coupled, owing to the ability of an NIU to be looped up and down, monitor line conditions, and execute performance monitoring duties. However, due to the possibility of an NIU card failure or some external event such as a power interruption, adding an NIU to the monitored circuit constitutes a potential failure point. As a consequence, it has been proposed to incorporate by-pass relay circuitry into the NIU card, as shown diagrammatically in FIG. 1.

In accordance with this NIU by-pass implementation, signal paths through respective network and customer transceiver circuits 11 and 13 of an NIU circuit card 10 are coupled to a first set of connection terminals 21, 26 and 31, 36 of a pair of associated relay-controlled switches 20 and 30. These switches have their contact arms 22, 24 and 32, 34 coupled to network line node pair 23, 27 and customer line node pair 33, 37. The switches are arranged to be controllably switched between the connection terminals 21, 26 and 31, 36 and connection terminals 25, 28 and 35, 38 by selective operation of a common relay coil 40. Energization current for the relay coil 40 is derived from a prescribed energizing DC voltage (e.g., 5 VDC) supplied by a DC—DC converter 45, that is coupled (through a fuse 47) to receive a prescribed DC voltage (e.g., −48 VDC) from a separate power supply path.

When energized (by the DC power supply 45), the relay coil 40 causes its contact arms to couple network equipment circuit paths 41, 51 to the NIU's network transceiver circuit 11 and customer equipment circuit paths 43, 53 to the NIU's customer transceiver circuit 13. In the event of a loss or absence of power to energize the relay, (the condition depicted in FIG. 1), the relay's contact arms by-pass the NIU transceiver components and, instead, connect the network circuit paths 41, 51 to the customer equipment circuit paths 53, 43, respectively, so as to minimize an interruption of (DS3) service.

Now, although the NIU-associated switching architecture of FIG. 1 will perform its intended by-pass functionality should there be a power supply failure, because the NIU by-pass relay 40 is physically installed on the same card containing the NIU components, the monitored (DS3) circuit will be undesirably interrupted should it become necessary to remove a damaged or malfunctioning NIU card from its housing or shelf. Moreover, as long as the power supply voltage is available to operate the relay, the architecture shown in FIG. 1 will not provide NIU by-pass, even if the NIU fails to work properly. In other words, in the prior art circuit architecture of FIG. 1, the only way to by-pass the NIU is to interrupt or remove the power supply.

SUMMARY OF THE INVENTION

In accordance with the present invention, these and other shortcomings of the prior art NIU by-pass architecture of FIG. 1 are effectively overcome by a new and improved NIU by-pass arrangement that is configured to by-pass the NIU in the event of a variety of abnormal or malfunction conditions, in addition to power failure, including failure and/or removal of the NIU card, so as to minimize an interruption of digital communications between respective customer and network digital communication devices over the communication circuit to which the NIU is controllably coupled.

For this purpose, the invention places the NIU circuitry proper, exclusive of associated by-pass switching (and relay) components, on its own removable circuit card, which may be installable in a backplane card slot of the circuit card cage portion of the telecommunication equipment housing. The by-pass switching circuitry is installed in a separate portion of the equipment shelf, so that physical removal of the NIU card will leave the by-pass circuitry intact. The architecture of the NIU by-pass scheme of the present invention is configured such that an abnormality of the NIU card, such as physical removal of the NIU from its card slot or a malfunction of the NIU will cause the circuit path through which power is supplied to the by-pass relay to be interrupted, thereby placing its switchable contacts in positions that provide communication connectivity between the customer and network communication devices over the communication circuit, by-passing the NIU.

Placing the by-pass relay in the housing proper, rather than on the NIU card, allows down time of the digital (DS3) circuit to be reduced substantially and in a manner that cannot be addressed by NIUs of the type shown in FIG. 1, for example, that implement by-pass on the NIU card itself in response only to internal power failure. In the NIU by-pass architecture of the present invention, if an external event damages the NIU, but NIU power remains intact, the NIU will still be by-passed. Namely, because the by-pass relay is outside or exclusive of the NIU card, the (DS3) circuit will not go down as the damaged NIU is removed.

In accordance with a non-limiting but preferred embodiment of the invention, the by-pass circuitry includes a switchable circuit path portion, in the form of switched relay contacts, that are configured to selectively couple the NIU's transceiver components with the (DS3) communication circuit, or to by-pass the NIU by providing a connectivity path over the communication circuit between the customer and network communication devices. The relay contacts are switched by an associated by-pass relay coil, power for which is supplied separately from the NIU card.

The by-pass relay coil is controllably energized by a control circuit, whose input is provided to the NIU card. The control circuit is arranged to receive a control signal representative of the operational capability of the NIU. The control circuit may include a failure indicator, such as a light emitting diode (LED), that is controllably energized in response to a malfunction of the operational capability of the NIU. In addition, after a removed NIU card or another NIU card has been reinstalled in the NIU card slot, the control circuit of the reinstalled card is configured to continue to maintain the relay coil in a de-energized state, bypassing the NIU's transceiver circuitry, until the control circuit receives a control signal representative of an acceptable operational status of the NIU.

DETAILED DESCRIPTION

Before describing the new and improved NIU by-pass architecture according to the present invention, it should be observed that the invention resides primarily in a prescribed combination of conventional telecommunication circuits, power supply and interface components therefor. As a consequence, the configurations of these circuits and components and the manner in which they may be interfaced with an existing digital signal wireline link have been illustrated in readily understandable block diagram format, which shows only those specific details that are pertinent to the present invention, so as not to obscure the disclosure with details that are readily apparent to one skilled in the art having the benefit of present description.

Figure 1:
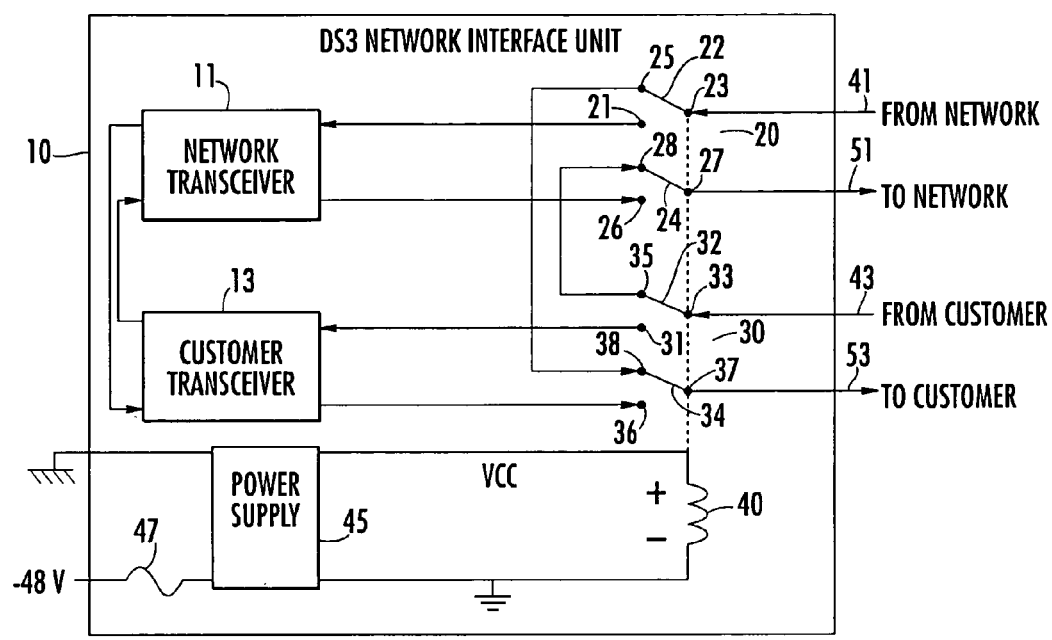
FIG. 1 diagrammatically illustrates a conventional NIU by-pass relay circuit.
Figure 2:
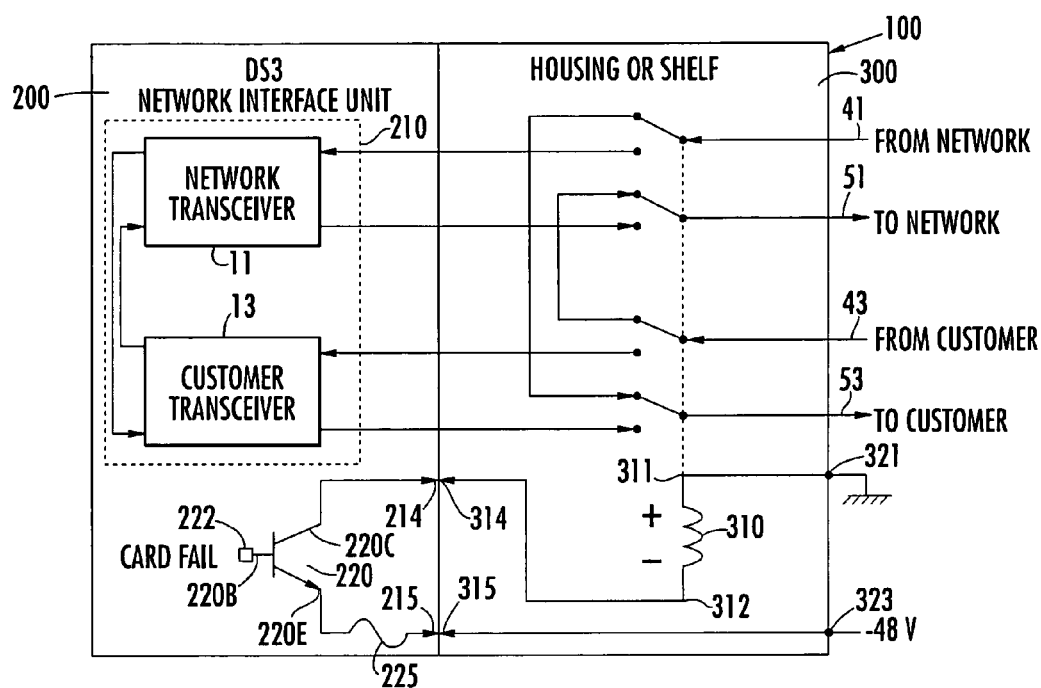
FIG. 2 diagrammatically illustrates a first embodiment of the NIU by-pass architecture of the invention.

A first, non-limiting, but preferred embodiment of the NIU by-pass architecture of the invention is shown diagrammatically in FIG. 2, as comprising an NIU circuit card 200 and a by-pass relay circuit 300, that are installed in separate portions of a telecommunication equipment housing or shelf 100. The NIU circuit card 200 contains a network/customer transceiver unit 210, which may be of the type shown in FIG. 1, described above.

The transceiver unit 210 of the network interface unit serves as both a monitoring unit and as a signal regenerator. The monitoring unit may correct line code violations and overwrite selected bits in data streams to provide performance information to a management system of the type customarily employed in telecommunication systems. The full duplex data communication signals between the network communication device and the customer communication device are demodulated and modulated in the transceiver circuit pair 11, 13 to provide regenerated signals.

The NIU circuit card is configured to be installed in a backplane card slot of a circuit card cage portion of the telecommunication equipment housing 100. As pointed out above, installing the by-pass relay circuitry 300 in a portion of the equipment shelf separate from the NIU card 200 allows the NIU card to be physically removed from (its card slot in) the equipment shelf, without affecting the intended by-pass effectiveness of the by-pass relay circuitry 300 relative to the network equipment circuit paths 41, 51 and customer equipment circuit paths 43, 53.

In the embodiment of FIG. 2, the relay-controlled switching components of the by-pass relay circuit 300 are shown as being configured the same as those of FIG. 1, and will not be redescribed here. Also, to simplify the drawing, the switching contact reference numerals of FIG. 1 have been omitted from FIGS. 2 and 3.

The relay switch positions are again shown for the relay coil's de-energized state. Thus, as long as relay coil 310 is de-energized, the NIU 200 is bypassed, and the FROM NETWORK signal passes straight to the TO CUSTOMER signal without going through the NIU transceivers. Similarly, the FROM CUSTOMER signal passes straight to the TO NETWORK signal also without going through the NIU transceivers.

As in the arrangement of FIG. 1, the contact arms of the switching components are controllably switched by the selective operation of a common relay coil 310. However, unlike the circuitry of FIG. 1, energization current for the relay coil 310 is derived from power supply terminals 321 and 323 (e.g. coupled to ground (GND) and −48V, respectively) of the equipment shelf, where the by-pass relay circuit 300 is installed, rather than on the NIU circuit card 200.

In particular, in the embodiment of FIG. 2, a first end 311 of the relay coil 310 is coupled to the (GND) power supply terminal 321, while a second end 312 of the relay coil 310 is coupled to a first current path connection port 314, that is arranged to be engaged by a corresponding current path connection port 214 of the NIU card 200, when the NIU card is installed and functioning properly in its card slot. The current path connection port 214 of NIU card 200 is coupled to a relay current control device, such as to the collector 220C of an NPN bipolar transistor 220. (It should be observed that although the relay current control device is shown in FIG. 2 as a bipolar transistor, it will be readily understood that other equivalent types of controlled switching devices, such as field effect transistors, silicon controlled rectifiers, opto-isolators, and the like, as non-limiting examples, may be employed.) The other (−48V) power supply terminal 323 is coupled to a second current path connection port 315, that is arranged to be engaged by a corresponding current path connection port 215 of an installed NIU card 200. The current path connection port 215 of the NIU card 200 is coupled through a fuse 225 to the emitter 220E of transistor 220. Relay current control transistor 220 has its base 220B coupled to receive a 'CARD FAIL' control signal coupled to a control port 222 from the NIU's supervisory communications controller (microprocessor).

In order to energize the relay coil 310 and thereby place the NIU's network/customer transceiver unit 210 in circuit with the (DS3) communication path for normal operation, there must be an available power supply for the relay coil (here GND and −48V at power supply terminals 321 and 323). In addition, the CARD FAIL control port 222 must be pulled high, so that transistor 220 will conduct. If no NIU is present, if the external power supply (−48V) is not present, if the fuse 225 is blown, or if some fault condition has caused the CARD FAIL control input to remain low, then no current path will be available to energize the relay coil 310 within the by-pass relay circuit 300. Fault conditions that may cause the CARD FAIL control input to remain low can include failure of the NIU's internal power supply, failure of the microprocessor to manage the NIU, and failure of the NIU to pass self-diagnostics at power-up.

Because the by-pass relay 310 is installed in a portion of the housing or shelf separate from the card slot for the NIU 200, an out of service NIU can be now be physically removed, without interrupting the network-customer digital (DS3) circuit. Since the NIU 200 is by-passed as it takes itself out of service, such as in response to its own failed power supply and other fault conditions, the likelihood that a damaged NIU will corrupt (network/customer) data is greatly minimized. Moreover, if a damaged or malfunctioning NIU is inadvertently placed back into its card slot, its associated DS3 circuit will not be interrupted by failure of the NIU power supply, or by failing to pass self-diagnostics, which keep the CARD FAIL input low.

Figure 3:
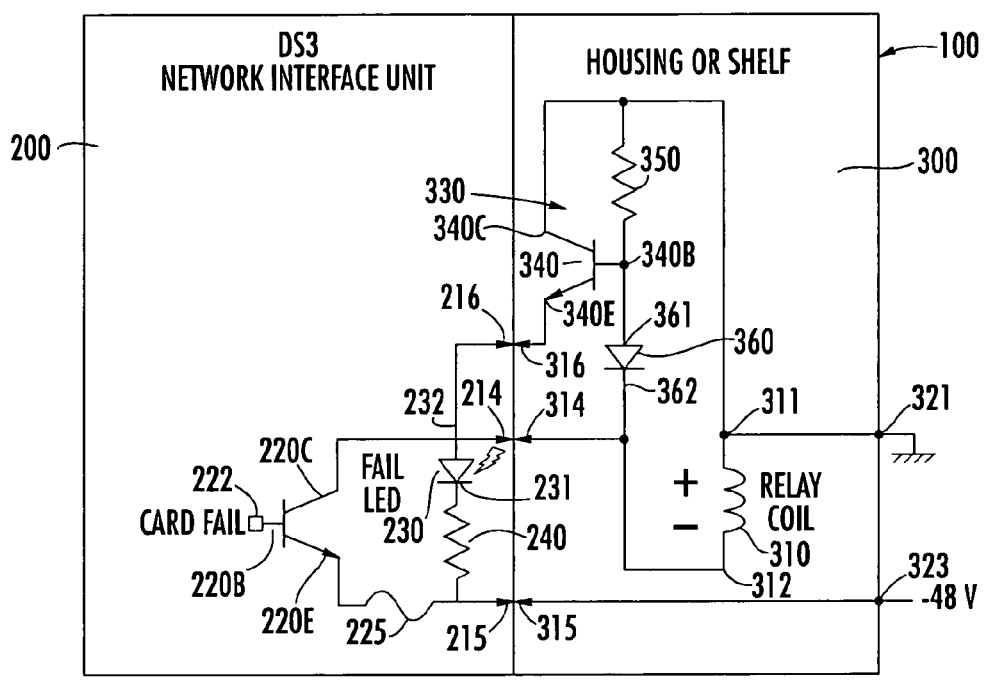
FIG. 3 illustrates the configuration of a second embodiment of the invention, in which a failure indicator is installed on the NIU card and an associated LED control circuit is incorporated into the by-pass relay circuit.

FIG. 3 illustrates the configuration of a second embodiment of the invention, in which a failure indicator 230, such as a FAIL LED, is installed on the NIU card 200, and an associated LED control circuit 330 is incorporated into the shelf-resident by-pass relay circuit 300. As shown therein, the LED 230 has its cathode 231 coupled through a resistor 240 to the (−48V) connection port 215, and its anode 232 coupled to an LED control port 216 of the NIU card 200. The LED control circuit 330 includes a control device, shown as an NPN bipolar transistor 340, having its emitter 340E coupled to an LED control port 316, which is arranged to be coupled in circuit with the LED control port of the NIU card 200, when the NIU card is installed in its card slot. Transistor 340 has its collector 340C coupled to GND and through a resistor 350 to its base 340B and to the anode 361 of a reverse blocking diode 360, the cathode 362 of which is coupled to the connection port 314.

In the circuit of FIG. 3, assuming that the NIU is installed in its card slot and power is available from the (−48V) power supply, then in response to the CARD FAIL signal being asserted high, transistor 220 will turn on, providing a current path for energizing the relay coil 310, as in the first embodiment, described above. This, in turn, pulls the base 340B of transistor 340 low, turning it off and interrupting a current path for the FAIL LED 230.

On the other hand, when the CARD FAIL input to the base 220B of transistor 220 is asserted low, transistor 220 will be turned off, so that there is no current path for energizing current for the relay coil 310. With no current path through relay coil 310, the base 340B of the transistor 340 will be pulled high, turning it on and providing a current path for the FAIL LED 230, so as to alert personnel of an NIU card failure. In this condition, the reverse blocking diode 360 serves to prevent current from flowing through the relay coil 310 to the base 340B of transistor 340 (which would erroneously energize the relay coil 310).

Because the FAIL LED 230 is powered from the connection port 316, a blown fuse or a failure of a power supply on the NIU card 200 will not prevent this indicator from turning on. Thus, except for an absence of −48V on the housing or shelf, any failure resulting in the unenergized relay 310 by-passing the NIU will turn on the FAIL LED 230, to indicate an NIU card failure.

As will be appreciated from the foregoing description, the present invention effectively obviates shortcomings of conventional NIU by-passing circuits, by placing the NIU on its own circuit card and exclusive of by-pass switching (and relay) components, that are installed in the equipment shelf, so that physical removal of the NIU card will leave the by-pass circuitry intact. The NIU by-pass scheme of the invention responds to an abnormality of the NIU card, such as malfunction or physical removal of the NIU from its card slot, and also to a power supply failure.

The ability of the invention to trigger an NIU by-pass upon the failure of self-diagnostics at power-up and on the inability of the microprocessor to manage the NIU constitutes a marked improvement over conventional schemes that can only rely upon the absence of a supply rail to identify missing external power, malfunctioning internal power, and a blown fuse, but are otherwise unable to identify damage that leaves the internal power supply intact.

Also, the use of an indicator to draw attention to a failed NIU increases the likelihood that someone will notice a damaged card, even though the power supply voltage (−48V) is present. If the −48V is absent, then it may be indeterminable whether an NIU is bad, and the by-pass relays will nonetheless complete the DS3 path. If −48V is present, a blown fuse or damaged power supply will not prevent the FAIL LED from turning on.

Moreover, not only does the invention greatly reduce interruptions to (DS3) circuits for a variety of fault conditions, but it also allows circuits to be connected to the housing and to be qualified when no NIU is present. As a result, a customer using a partially filled shelf can readily add and qualify more circuits before additional NIUs are installed. If the by-pass relay were located on the NIU card, a customer may not able to make new additions and early qualifications as readily, and therefore may not be able to place new circuits on line as quickly.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

The invention claimed is:

1. For use with a telecommunication equipment housing that is configured to support a communication circuit monitoring unit adapted to monitor one or more parameters of a communication circuit over which respective communication devices communicate with each other, a method of selectively coupling said monitoring unit with said communication circuit or causing said communication circuit to by-pass said monitoring unit, said method comprising the steps of:

(a) installing, in a first portion of said telecommunication equipment housing, a circuit card, which contains said monitoring unit and is exclusive of a switchable bypass circuit through which communication connectivity between said respective communication devices, which by-passes said circuit card and said monitoring unit contained therein, may be provided; and (b) installing, in a second portion of said telecommunication equipment housing, exclusive of said first portion thereof, said switchable by-pass circuit which is controllably operative to selectively provide a first communication path therethrough between said monitoring unit and said communication circuit, or to provide a second communication path therethrough between said respective communication devices over said communication circuit, bypassing said monitoring unit; and wherein said switchable bypass circuit is operative, in response to physical removal of said circuit card from said first portion of said telecommunication equipment housing, to provide said second communication path therethrough, so that communication connectivity between said respective communication devices is maintained by way of said switchable by-pass circuit, irrespective of the whether or not said circuit card is physically installed in or removed from said first portion of said telecommunication equipment housing.

2. The method according to claim 1, wherein step (b) includes providing power for operating said switchable bypass circuit at said second portion of said telecommunication equipment housing and exclusive of said first portion of said telecommunication equipment housing.

3. The method according to claim 1, wherein said switchable by-pass circuit includes a controlled relay, having a relay coil, and associated switchable contacts which provide said first communication path therethrough in response to energization of said relay coil, and which provide said second communication path therethrough in the absence of energization of said relay coil.

4. The method according to claim 3, wherein said circuit card includes a control circuit for controlling operation of said switchable by-pass circuit, and wherein said step (b) includes causing said control circuit to selectively energize said relay coil in accordance with the operational capability of said monitoring unit.

5. The method according to claim 4, wherein step (b) includes selectively activating an indicator in accordance with a deficiency in operational capability of said monitoring unit.

6. The method according to claim 3, wherein step (b) includes activating an indicator in association with de-energization of said relay coil.

7. The method according to claim 1, wherein said communication circuit comprises a digital communication circuit and said monitoring unit comprises a network interface unit.

8. The method according to claim 1, wherein said switchable bypass circuit is operative, in response to occurrence of an anomaly associated with the intended operation of said monitoring unit, to provide said second communication path therethrough, so that communication connectivity between said respective communication devices is maintained by way of said switchable by-pass circuit.

9. A telecommunication equipment housing architecture comprising:
   a circuit card installed in a first portion of said telecommunication equipment housing and containing a communication circuit monitoring unit that is operative to monitor one or more parameters of a communication circuit over which respective communication devices communicate with each other, said circuit card being exclusive of a switchable by-pass circuit through which communication connectivity between said respective communication devices, which bypasses said circuit card and said monitoring unit contained therein, may be provided; and
   a monitoring unit bypass circuit installed in a second portion of said telecommunication equipment housing exclusive of said first portion thereof, said monitoring unit by-pass circuit including said switchable by-pass circuit which is controllably operative to selectively provide a first communication path therethrough between said monitoring unit and said communication circuit, or to provide a second communication path therethrough between said respective communication devices over said communication circuit, bypassing said monitoring unit; and wherein
   said switchable bypass circuit is operative, in response to physical removal of said circuit card from said first portion of said telecommunication equipment housing, to provide said second communication path therethrough, so that communication connectivity between said respective communication devices is maintained by way of said switchable bypass circuit, irrespective of the whether or not said circuit card is physically installed in or removed from said first portion of said telecommunication equipment housing.

10. The telecommunication equipment housing architecture according to claim 9, wherein power for operating said switchable bypass circuit is provided at said second portion of said telecommunication equipment housing and is exclusive of said first portion of said telecommunication equipment housing.

11. The telecommunication equipment housing architecture according to claim 9, wherein said switchable by-pass circuit includes a controlled relay, having a relay coil, and associated switchable contacts which provide said first communication path therethrough in response to energization of said relay coil, and which provide said second communication path therethrough in the absence of energization of said relay coil.

12. The telecommunication equipment housing architecture according to claim 11, wherein said circuit card includes a control circuit that is operative to selectively energize said relay coil in accordance with the operational capability of said monitoring unit.

13. The telecommunication equipment housing architecture according to claim 12, wherein said control circuit includes an indicator and is operative to selectively activate said indicator in accordance with a deficiency in operational capability of said monitoring unit.

14. The telecommunication equipment housing architecture according to claim 11, wherein said control circuit includes an indicator and is operative to activate said indicator in association with deenergization of said relay coil.

15. The telecommunication equipment housing architecture according to claim 9, wherein said communication circuit comprises a digital communication circuit and said monitoring unit comprises a network interface unit.

16. The telecommunication equipment housing architecture according to claim 9, wherein said switchable by-pass circuit is operative, in response to occurrence of an anomaly associated with the intended operation of said monitoring unit, to provide said second communication path therethrough, so that communication connectivity between said respective communication devices is maintained by way of said switchable by-pass circuit.

* * * * *